United States Patent [19]
Jonner et al.

[11] Patent Number: 5,947,567
[45] Date of Patent: Sep. 7, 1999

[54] HYDRAULIC VEHICLE BRAKE SYSTEM WITH WHEEL SLIP REGULATOR DEVICE

[75] Inventors: Wolf-Dieter Jonner, Beilsein Schmidhausen; Helmut Pueschel, Marbach; Thomas Isella, Markgroeningen; Karl-Heinz Willmann, Freiberg; Rolf Hummel, Steinenbronn; Elmar Mueller, Markgroeningen; Johann Herr, Vaihingen; Roland Holzmann, Moeglingen; Guenter Dzierzawa, Margaretenweg; Martin Moehle, Steinheim; Hans-Juergen Herderich, Kernen, all of Germany

[73] Assignee: Robert Bosch GmbH, Stuttgart, Germany

[21] Appl. No.: 08/755,617

[22] Filed: Nov. 25, 1996

[30] Foreign Application Priority Data

Nov. 25, 1995 [DE] Germany .......................... 195 43 962

[51] Int. Cl.$^6$ ....................................................... B60T 8/42
[52] U.S. Cl. ...................................................... 303/115.4
[58] Field of Search ............................. 303/115.4, 115.5, 303/10, 11, 116.3, 116.1

[56] References Cited

U.S. PATENT DOCUMENTS

| | | | |
|---|---|---|---|
| 4,832,579 | 5/1989 | Norton | 417/287 |
| 5,228,289 | 7/1993 | Norton | 60/486 |
| 5,413,470 | 5/1995 | Eisenmann | 418/171 |
| 5,476,374 | 12/1995 | Langreck | 418/171 |
| 5,501,514 | 3/1996 | Resch et al. | 303/115.4 |

FOREIGN PATENT DOCUMENTS

| | | |
|---|---|---|
| 0482367 | 4/1992 | European Pat. Off. . |
| 1553082 | 7/1963 | Germany . |
| 2554105 | 6/1977 | Germany . |
| 2922921 | 12/1979 | Germany . |

*Primary Examiner*—Robert J. Oberleitner
*Assistant Examiner*—Melanie Talavera
*Attorney, Agent, or Firm*—Edwin E. Greigg; Ronald E. Greigg

[57] ABSTRACT

The invention relates to a hydraulic vehicle brake system with a master cylinder, with two brake circuits (I, II), with wheel brakes connected to the brake circuits (I, II), and with a wheel slip regulator device disposed between the master cylinder and the wheel brakes, which device has at least one brake pressure modulation valve device and at least one high pressure pump, and with a pump unit associated with this high pressure pump. In the automatic braking operation by means of at least one of the high pressure pumps, the pump unit is used for supplying hydraulic fluid to the high pressure pump. The pump unit has a low pressure pump in the form of a gear pump. To limit the pressure at an outlet of the low pressure pump at least one return flow conduit is provided between this outlet and an inlet, which conduit, in a manner according to the invention constitutes a throttle by which the choice of its cross section, which throttle is for controlling at least one return flow which increases with increasing pressure at the outlet and as a result achieves the pressure limiting. The hydraulic vehicle brake system can be used for cars, minibuses, and small trucks.

11 Claims, 5 Drawing Sheets

HYDRAULIC VEHICLE BRAKE SYSTEM WITH WHEEL SLIP REGULATOR DEVICE

BACKGROUND OF THE INVENTION

The invention relates to a hydraulic vehicle brake system with a wheel slip regulator device.

EP O 482 367 A1 has disclosed a hydraulic vehicle brake system whose wheel slip regulator device is disposed between a two-circuit master cylinder and wheel brakes of four vehicle wheels and, for braking operation by means of the master cylinder through the actuation of the brake pedal, has a so-called return feed pump in each brake circuit. The feed pump can produce high pressure, and has electrically controllable directional control valve devices associated with the wheel brakes, wherein by means of the directional control valve devices, each of the wheel brakes of wheels that are in danger of locking can be temporarily isolated from the master cylinder and can be connected to the associated return feed pump so that this return feed pump conveys hydraulic fluid away from the respective wheel brake and back into the master cylinder. The vehicle brake system is also updated to limit drive slip of drivable wheels to a favorable slip value range by means of automatic brake pressure generation in at least one wheel brake of its driven wheels. One of the return feed pumps is used as a means for generating high pressure for this, which is supplied at a partial or full level, depending on conditions, by means of at least one of the directional control valve devices to the at least one wheel brake to change the drive slip by compensating for the driving torque surplus. For this automatic braking operation, the vehicle brake system has another pump unit, which has a low pressure pump in the form of a gear pump that is essentially leakage flow free or has only a small amount of leakage flow, a pressure limiting valve in a first bypass line disposed between an outlet and an inlet of the gear pump, a throttle in a second bypass line connected parallel to the first bypass line, and a motor to drive the low pressure pump.

For example, the gear pump is equipped with an internal geared ring and can be purchased under the name of "Gerotor pump" at the W. H. Nichols Company. For the operation of the drive slip regulator, this low pressure pump, by means of a check valve, supplies the return feed pump with hydraulic fluid aspirated from a reservoir and is used, by means of another check valve, to apply the brake linings of at least one wheel brake to its brake disk or brake drum at the beginning of an operation of the drive slip regulator.

When bleeding the completely assembled hydraulic vehicle brake system before it is filled with hydraulic fluid, the throttle and the second bypass are used to evacuate a connecting line leading from the outlet of the low pressure pump and branches to the check valves mentioned and are then used to fill this connecting line with hydraulic fluid by means of the reservoir. As a result, when the vehicle brake system is first operated, the low pressure pump does not force air into the vehicle brake system, which can disadvantageously reduce the effectiveness of the brake system in a known manner. The disposition of the two bypasses, the pressure limiting valve, and the separately embodied throttle is expensive, takes up space, and increases the weight of the vehicle brake system.

DE 42 26 646 A1 discloses another hydraulic vehicle brake system with a wheel slip regulator device between a master cylinder and wheel brakes of vehicle wheels and with a pump unit that supplies return feed pumps of the wheel slip regulator device for automatic braking. In addition to regulating or limiting drive slip by means of individual wheel brakes, this vehicle brake system is also furnished to generate yawing moments and/or to generate or change lateral slip of vehicle wheels to automatically improve the driving behavior of a vehicle equipped in this manner to aid the driver up to the limit of what is physically possible when negotiating curves. For example, the pump unit is embodied in the manner disclosed in EP 0 482 367 A1. What differs is that in the example of DE 42 26 446 A1, the pump unit supplies both return feed pumps with hydraulic fluid for automatic braking so that all the vehicle wheels associated with both brake circuits can be automatically braked as a function of conditions and can be braked independently of one another. DE 42 26 446 A1 discloses different brake circuit embodiments and different associations of front wheel brakes and rear wheel brakes to the brake circuits.

A hydraulic vehicle brake system disclosed by DE 42 32 311 C1, U.S. Pat. No. 5,501,514, likewise has a master cylinder, a wheel slip regulator device, a pump unit, and wheel brakes and additionally has a cylinder device with a dividing piston, which device is connected between the master cylinder and the wheel slip regulator device in each brake circuit. The cylinder devices with their dividing pistons have the task of conducting the pressure produced by the pump unit into the wheel slip regulator device and also of preventing the penetration of surrounding air aspirated by the pump unit. Correspondingly, only the contents of the cylinder devices are displaced into the wheel slip regulator device. At the beginning of an automatic braking operation, a partial quantity of the displaced hydraulic fluid reaches at least one of the wheel brakes for application of the brake lining, and another partial quantity is supplied to the respective return feed pump for the generation of brake pressure. The pump unit likewise corresponds to a construction disclosed by DE 42 26 646 A1 that has the expensive pressure limiting valve. The cylinder devices with the dividing piston also make the hydraulic brake system more expensive.

OBJECT AND SUMMARY OF THE INVENTION

The vehicle brake system has the advantage over the prior art that it avoids the expenditure for the prior known disposition of two bypass lines, for the pressure limiting valve built into the one bypass line, and for the throttle built into the other bypass line.

Advantageous improvements and updates of the hydraulic vehicle brake system are possible by means of the measures set forth hereinafter.

Other features indicate an exemplary embodiment for the "gear wheel pump" type. Still other features definitely indicate an exemplary embodiment for a so-called internal gear ring pump, which is also known under the name "Gerotor" pump.

While other features produce a more reasonably priced production model of the pump unit because in a reasonably priced manner, the housing cover also takes on the task of uniting the low pressure pump with its motor.

Yet other features indicate selection possibilities for embodying wheel slip regulator devices that can be supplied with hydraulic fluid for automatic braking operation of at least one of the low pressure pumps that are essential to the invention. Therefore, the embodiment of a low pressure pump, which embodiment is essential to the invention, can be combined with wheel slip regulator devices that are already known and can also be combined with wheel slip regulating devices that diverge from the known embodiments.

DESCRIPTION OF THE PREFERRED EMBODIMENTS

Figure 1:
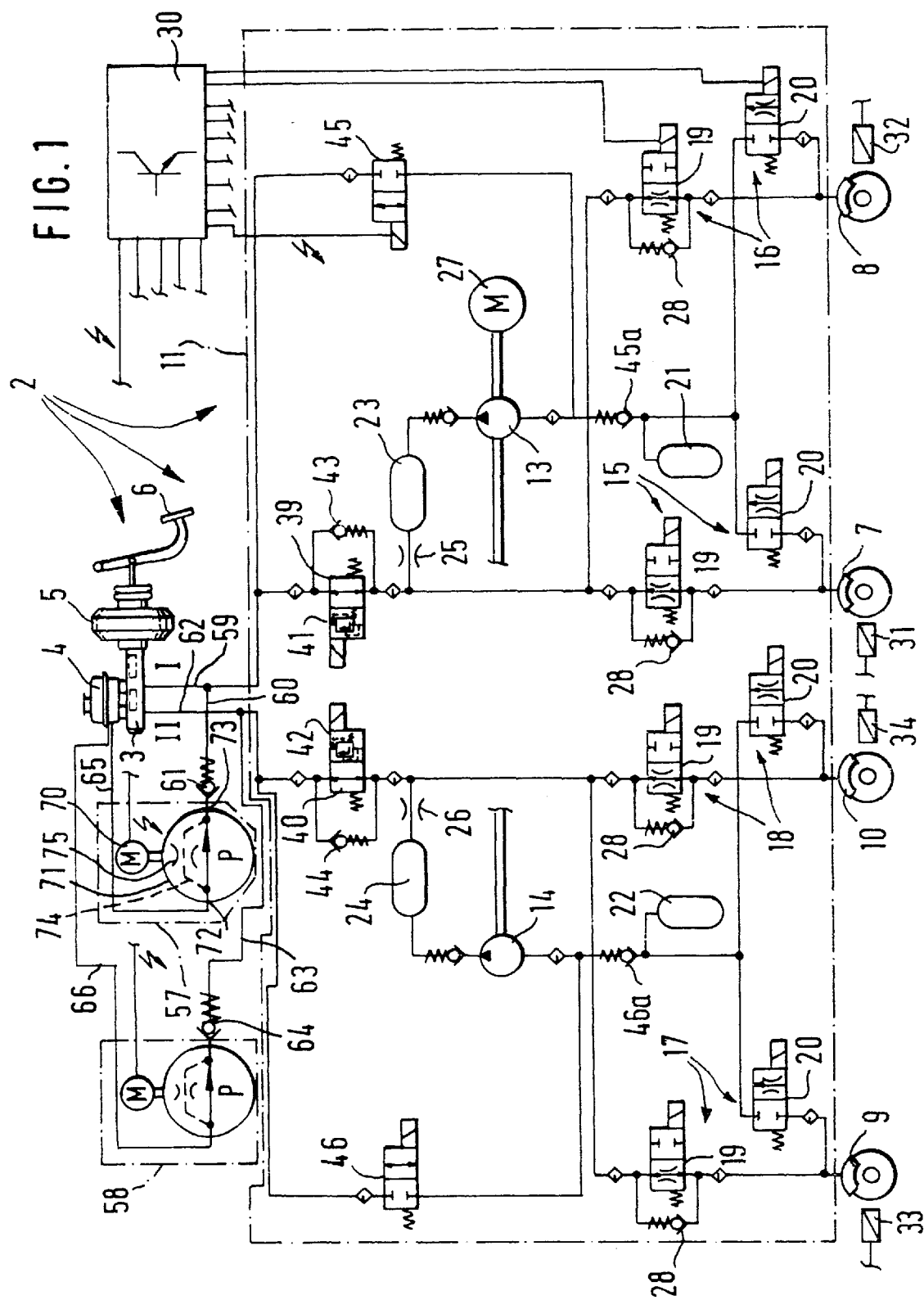
FIG. 1 shows a circuit diagram of a first exemplary embodiment of the hydraulic vehicle brake system with at least one pump unit according to the invention.

The first exemplary embodiment of the hydraulic vehicle brake system 2 according to FIG. 1 has a two-circuit master cylinder 3 with a reservoir 4, for example with a pneumatic power brake 5, and with a brake pedal 6, two brake circuits I and II, wheel brakes 7 and 8 associated with brake circuit I, wheel brakes 9 and 10 associated with brake circuit II, and a wheel slip regulator device 11 disposed between the master cylinder 3 and the wheel brakes 7 to 10.

By way of example, the master cylinder 3 is constructed in a manner that is known per se and can be actuated with the aid of the brake pedal 6 so that braking pressures are produced in the brake circuits I and II. The action that can be exerted on the master cylinder 3 by means of the brake pedal 6 can be boosted by means of the power brake 5. The reservoir 4 supplies the master cylinder 3 with hydraulic fluid that can be forced out of the master cylinder 3 toward the wheel brakes 7 to 10 through the wheel slip regulator device 11 for a normal braking operation.

In order to limit wheel slip when actuating the brake pedal 6, the wheel slip regulator device 11 is embodied as a so-called return feed type and has a return feed pump 13 for brake circuit I and a return feed pump 14 for brake circuit II. Furthermore, the wheel slip regulator device 11 has a separate brake pressure modulation valve device 15, 16, 17, or 18 for each of the wheel brakes 7 to 10, which device is comprised for example of a brake pressure increase valve 19 and a brake pressure decrease valve 20 respectively, as well as a storage chamber 21 or 22 for each brake circuit I and II. Furthermore, for example a first damping chamber 23 is provided for brake circuit I and a second damping chamber 24 is provided for brake circuit II, as well as a damping throttle 25 or a damping throttle 26 respectively. As the drive, a motor 27 is associated with the return feed pumps 13 and 14. Starting from the wheel brakes 7 to 10, their respectively associated brake pressure increase valves 19 can be bypassed in the direction of the master cylinder 3 by means of check valves 28 that can be opened in the direction of the master cylinder 3 via the respective brake pressure increase valve 19 in the event of a pressure drop, for example if this is actuated into its closed position or if an associated throttle is effective in its normal open position.

In the event of an actuation of the brake pedal 6 and therefore of the brake pressure supplied to wheel brakes 7 to 10, wheel slip regulator operation is possible by means of the individual elements of the wheel slip regulator device 11 that have been mentioned. To this end, the brake pressure increase valves 19, which are normally found in the open position, are disposed between each wheel brake 7 to 10 and the master cylinder 3 so that by means of actuating the brake pedal 5, pressure produced in the master cylinder 3 can normally reach the wheel brakes 7 to 10. Each of the brake pressure reduction valves 20 of the brake pressure modulation valve devices 15 and 16 or 17 and 18 is likewise connected to the wheel brakes 7 to 10 is closed in the normal position, and in a controlled position, permits a throttling passage and is connected on the inlet side with the return feed pump 13 of brake circuit I or is connected on the inlet side to return feed pump 14 of brake circuit II. The dampers 23, 24 are connected to the outlet side of the return feed pumps 13, 14. In the direction toward the master cylinder 3 as well as toward the respective brake pressure increase valves 19, the throttles 25, 26 are disposed after the damping chambers 23, 24.

The wheel slip regulator device 11 also includes an electronic control device 30 as well as wheel rotation sensors 31 to 34 that are associated with the wheels, which are not shown and can be braked by means of the wheel brakes 7 to 10. The control device 30 is connected to these wheel rotation sensors 31 to 34. For its part, the control device 30 is connected on the one hand to the individual valves 19, 20 of the brake pressure modulation valve devices 15 to 18 and on the other hand, is connected to the motor 27.

For example, if the brake pedal is actuated with increasing force on a road that has uniformly favorable traction, then the successions of signals sent by the wheel rotation sensors 31 to 34 change in a way that the control device 30 then interprets as increasing brake slippage with imminent danger of locking. Assuming the danger of wheel locking occurs with equal intensity in all wheels at once, then the control device 30 switches the motor 27 on and with it, the return feed pumps 13 and 14, closes all brake pressure increase valves 19 of the brake pressure modulation valve devices 15 to 18 and opens all associated brake pressure decrease valves 20. This results in the fact that pressure that is possibly increasing further in the master cylinder 3 does not reach the wheel brakes 7 to 10, but rather that quantities of hydraulic fluid flow out from these wheel brakes 7 to 10 to the storage chambers 21 or 22 with the result that wheel locking danger is either reduced or eliminated. Quantities of hydraulic fluid then flow out from the storage chambers 21 or 22 into the return feed pumps 13 or 14. As a result of this, these return feed pumps 13 and 14 force hydraulic fluid through the damping chambers 23 or 24 and the throttles 25 and 26, and through both brake circuits I and II, back to the master cylinder 3. After the danger of wheel locking has passed, assuming here that coincidentally the danger of wheel locking disappears in all wheels 7 to 10 simultaneously, the brake pressure modulation valve devices 15 to 18 are brought into their normal positions by virtue of the fact that the control device 30 ends the supply of control currents required for the reduction of brake pressure. For example, if no further danger of wheel locking occurs during a subsequent, preselected length of time, then the control device 30 also ends the supply of current to the motor 27.

For example, the control device 30 is also equipped so that in the event of different wheel locking dangers in the wheels, pressures in the wheel brakes 7 to 10 can be changed individually and independently of one another.

For automatic braking, the wheel slip regulator device 11 also has a reversing valve 39 or 40, a pressure limiting valve 41 or 42, and a one-way check valve 43 or 44. Furthermore, the return feed pumps 13 or 14 are also associated on the inlet side with 2/2-way valves 45 and 46 as well as one-way check valves 45a and 46a. At least one pump unit 57 or 58 is provided to supply the wheel slip regulator device 11 for automatic braking operation. The pump unit 57 is associated with brake circuit I. To this end, a feed line 60 runs from the pump unit 57 to a main brake line 59, which is disposed between the master cylinder 3 and the wheel slip regulator device 11; a one-way check valve 61 that can be opened toward the main brake line 59 is installed in this feed line 60. If the second pump unit 58 is installed, then another feed line 63 is disposed between [the pump unit 58 and] a main brake line 62 associated with brake circuit II, which is likewise disposed between the master cylinder 3 and the wheel slip regulator device 11; a check valve 64 is likewise installed in this second feed line 63, this time so that it can be opened toward the main brake line 62.

The pump unit 57 is connected to the reservoir 4 by means of a suction line 65 and the pump unit 58 is likewise connected to the reservoir by means of another suction line 66. The pump units 57 and 58 are embodied identically.

Only one pump unit 57 is provided if the wheel brakes 7 and 8 of brake circuit I are front wheel brakes of a vehicle whose front wheels can be driven and/or whose front wheels are less prone to lateral drift than the rear tires of this vehicle when negotiating curves. In the event of driven front wheels, automatic braking of at least one front wheel is provided to limit drive slip. In the event that the front wheels are less prone to lateral drift than the rear wheels and as a result, an angular acceleration of the vehicle around its center of gravity can occur, i.e. an oversteering or skidding can take place, automatic braking also occurs, by means of which the lateral slip of the front wheels is increased and as a result, the oversteering tendency or the skidding is counteracted.

For example, if the control device 30 recognizes that at least one of the wheels associated with the wheel brakes 7 and 8 should be automatically braked based on signal sequences from the wheel rotation sensors 31 to 34, then the control device 30 switches the at least one pump unit 57 on so that it supplies the return feed pump 13 with hydraulic fluid through the 2/2-way valve 45 that is simultaneously opened electrically by the control device 30 so that with a conversion of the reversing valve 39 into operation as a pressure limiting valve 41, this return feed pump 13 produces pressure for the at least one wheel brake 7 or 8. In so doing, the pump unit 57 can on the one hand ensure a favorable filling of the return feed pump 13 so that the delivery capacity of the return feed pump 13 comes close to the theoretical delivery capacity. At the same time, also by means of the one-way check valve 43 that bridges over the reversing valve 39, a pressure is made available to the at least one wheel brake 7 or 8 for the application of the brake shoes. As a result, a rapid application of brake shoes and a swift increase of braking force can be achieved in a known manner.

For example, in the event that the wheel brakes 7 and 8 of brake circuit I are associated with the drivable front wheels of a vehicle, and that this vehicle tends to understeer, i.e. to break out of the curve with its front wheels, then brake circuit II, as shown in FIG. 1, is designated for rear wheel brakes 9 and 10 and the pump unit 58, the reversing valve 40 with the integrated pressure limiting valve 42, the one-way check valve 44, and the 2/2-way valve 46 are associated with this brake circuit II. It is therefore clear that an automatic brake pressure generation is possible in the manner already described for brake circuit I, where in turn, a rapid brake shoe application and a swift brake pressure increase are possible. By means of a braking of rear wheels that is consequently possible, it is achieved that these rear wheels drift more intensely from the curve and thereby counteract a turning of the vehicle "out from the curve". It was emphasized at the beginning that braking individual wheels can produce yawing moments which can be used to facilitate steering when starting or finishing the negotiation of a curve. Accordingly, the control device 30 is in a position to individually supply the wheel brakes laterally with brake pressure in the sense of a so-called steering brake, which is known for example in cross-country vehicles like farming tractors, which have a particular brake pedal for the right and left brakes respectively.

One feature of the invention is comprised in that the at least one pump unit 57 or 58 forces hydraulic fluid into the main brake line 59 or 62 for the automatic braking operation. As described above, as a result, the return feed pumps 13 and 14 receive hydraulic fluid to achieve a favorable delivery capacity. Since on the other hand, the master cylinder 3 is embodied in a way that is known per se, when the brake pedal 6 is not actuated, there are hydraulic connections to the reservoir 4 so that the respective pump unit 57 or 58 supplies hydraulic fluid to the reservoir 4 from which the hydraulic fluid was previously aspirated. Since the hydraulic connections mentioned occasionally have so-called blow openings that are normally open or central valves that are normally open, and are therefore encumbered with through flow resistances, pressure banks up in the main brake lines 59 or 62, which, particularly with winter temperatures and the viscosity of the hydraulic fluid caused by them, produces a sufficient supply pressure for filling the return feed pumps 13 or 14. If the banked-up pressure is sufficient to fill the return feed pumps 13 or 14, even with low viscosity as a result of summer temperatures of the hydraulic fluid, then these pumps can be embodied as so-called free-piston pumps. Otherwise, the return feed pumps are embodied as self-aspirating pumps.

Figure 4:
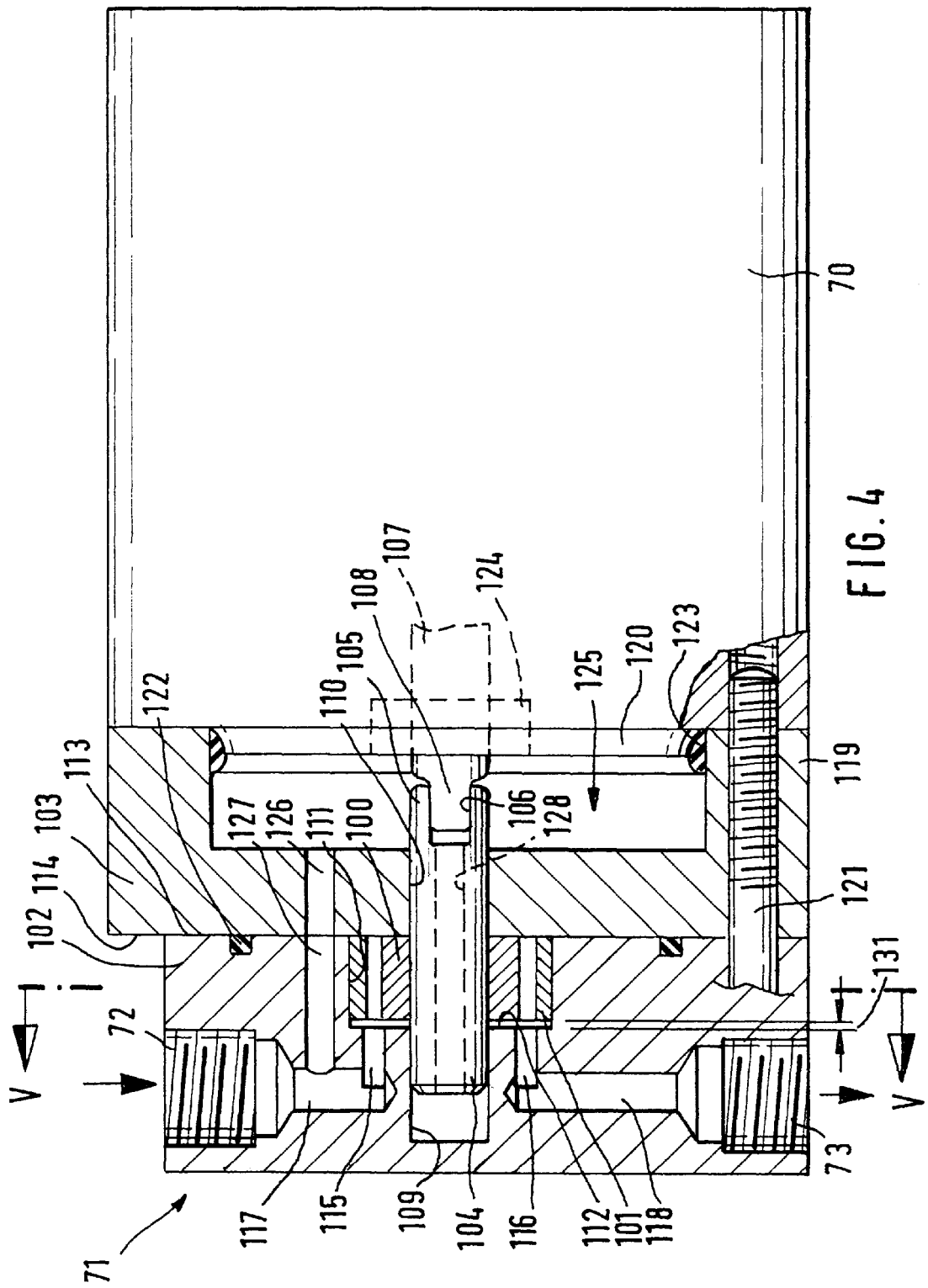
FIG. 4 shows a partial longitudinal section through the pump unit according to the invention.
Figure 5:
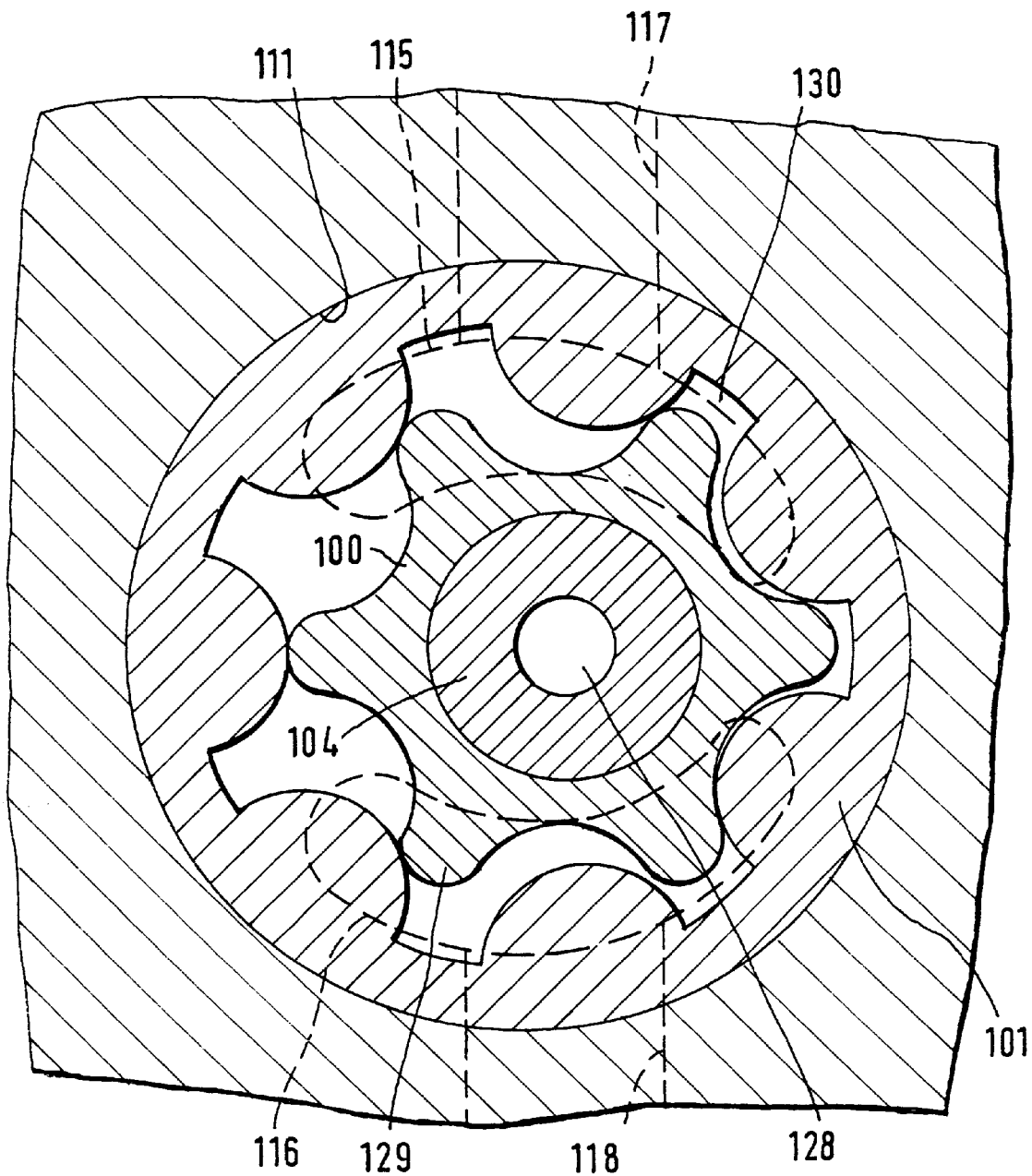
FIG. 5 shows a cross section through the pump unit according to the invention from FIG. 4.

The pump unit 57 is comprised of a motor 70 and a low pressure pump 71 driven by it, which pump is symbolically represented and has an inlet 72 connected to the suction line 65 and an outlet 73 connected to the check valve 61 and according to the invention, has at least one return flow conduit 74 connecting the outlet 73 to the inlet 72, which conduit is embodied according to the invention so that it functions as a throttle 75 that controls a return flow when there is a pressure difference between the outlet 73 and the inlet 72. In FIG. 1, therefore, the widely used symbol of a pump according to DIN ISO 1219 is supplemented by a dashed line, which is used in accordance with DIN ISO 1219 for discharge lines and leakage lines. This dashed line is associated with the symbol of a throttle according to DIN ISO 1219. The technical embodiment is described below in conjunction with FIGS. 4 and 5.

The low pressure pump 71 is of the "Gerotor pump" type mentioned at the beginning and as a result of the connection of the outlet 73 through the throttle 75 to the inlet 72, has the property that a theoretical feed quantity, which could be set in the event of unhindered discharging of hydraulic fluid by means of the outlet 73, is not achieved. Rather, the throttle 75 is dimensioned so that with the viscosity of the hydraulic fluid as a result of the winter temperatures mentioned earlier, when the motor 70 is switched on, a return flow through the throttle 75 is produced such that only a pressure of for example 7 bar is then achieved in the main brake line 59 if, for example, the hydraulic fluid that is supplied to the main brake line 59 does not flow into the return feed pump 13 and does not flow through one of the brake pressure increase valves 19.

A practical exemplary embodiment of the low pressure pump 71 according to the invention has a drivable gear 100 as a first rotatable element and has a so-called internal gear ring 101, which is supported eccentric to the gear 100, encompassing the gear 100, and meshing with it, which is why the pump 71 also has the name "internal gear pump". As mentioned above, this low pressure pump 71 is also known under the name "Gerotor pump". The low pressure pump 71 also has a housing 102, a housing cover 103, and a drive shaft 104 for the gear 100.

The gear 100 is supported and can be driven by means of a for example press-fitted drive shaft 104 which has a laterally running groove-like recess 105 on an end oriented toward the motor 70. A motor shaft 107 protruding from the motor 70 is flattened into a driver 108, wherein the driver 108 dips into the recess 106 for the transmission of drive torques. The drive shaft 104 is rotatably supported in a bearing bore 109 disposed in the housing 102 and a bearing bore 110 disposed in the housing cover 103.

In the housing adjacent to the bearing bore 109, a bore 111 is disposed, which is eccentric to the bearing bore 109, that is offset from the axis. The bore 111 receives the internal gear ring 101 so that it can rotate with a slight amount of radial play. In the axial direction, the depth of the bore 111 is defined by a face 112 that is fixed to the housing and is aligned crosswise to the bore 110. This face has a preset spacing from a defining face on the housing cover side. A cover face 114 rests against this defining face 113. The gear 100 and the internal gear ring 101 are disposed between the cover face 114 and the face 112, having an axial play that is described below.

A first, arc-shaped recess 115 that is curved around the bearing bore 109 and a likewise curved recess 116 start from the face 112. Each of the two recesses extends over an arc that encompasses less than 180°. The recesses are essentially embodied in the form of grooves. By means of a connecting bore 117, the first recess 115 is connected to the inlet 72 disposed in the housing 102 and in this manner, forms an intake conduit which feeds into the gear 100 and to the internal gear ring 101. By means of a connecting bore 118, the second recess 116 is connected to the outlet 73 likewise disposed on the housing 102 so that the recess 116 forms a pressure conduit beginning at the gear 100 and the internal gear 101. The inlet 72 and the outlet 73 are embodied for example in the form of threaded connections.

Toward the motor 70, the housing cover 103 is provided with a tubular extension 119 into which a centering attachment 120 of the motor 70 is slid. At least one screw 121 is provided for holding together the housing 102, the housing cover 103, and the motor 70. A sealing ring 122 is inserted between the housing 102 and the housing cover 103. Another sealing ring 123 is used as a seal between the extension 119 and the motor 70. An additional sealing ring 124 sealingly encompasses the motor shaft 107. A cavity 125 is disposed inside the extension 119 and also between the motor 70 and the housing cover 103. Outside the projection of the bore 111, this cavity is connected to the connecting bore 117 and consequently to the inlet 72 by means of a first connecting bore 126 that extends through the housing cover 103 and a second connecting bore 127, which extends into the housing 102 and is connected to the first bore. A pressure compensating bore 128 extends through the drive shaft 104.

For example, the gear 100 has six teeth 129 and the internal gear ring 101 accordingly has seven tooth spaces 130. The shape of the teeth and the tooth spaces is not the subject of the invention, because a gear and an internal gear ring, which have a geometry that is commercially available, can be used here. If the motor 70 drives the gear 100, the internal gear ring 101 is also rotated. In the region of recess 115, teeth 129 are coming out of tooth spaces 130 in succession and in the region of recess 116, teeth 129 are dipping into tooth spaces 130 in succession, with the intrinsically known result that hydraulic fluid flows out of the first recess 115 in between the gear 100 and the internal gear ring 101, and then out again and is forced into the second recess 116. As a result, with a correctly chosen rotation direction of the drive shaft 104 a pressure is set at the outlet 73, which is higher than a pressure at the inlet 72. In other words, a pressure drop is produced between the second recess 116 and the first recess 115.

Because of the already mentioned axial play of the gear 100 between the face 112 and the cover face 114 and also because of the axial play of the internal gear ring 101 between said faces 112 and 114, this pressure drop leads to leakage flows, i.e. to at least one return flow inside the pump 71. Volume flows caused as a result are larger the greater the pressure drop, the greater the axial play, and the less viscous the hydraulic fluid, e.g. due to heating with operation of the pump or with summer temperatures. For example, both axial plays are embodied as equal in magnitude and are thus indicated in FIG. 4 with a common reference numeral 131. Therefore for the sake of simplicity, the axial plays between the gear 100 or the internal gear ring 101 and the face 112 are drawn as being of the same size, which, however, is not absolutely required, as is explained below. In the case represented graphically, it is clear that the pressure drop mentioned by means of the axial play 131 and by means of the bore 111 on the one hand and the drive shaft 104 on the other, between recess 116 and recess 115, two cross sections are available, which are both characterized in common in FIG. 1 as the throttle 75. As a result, it is clear that in the cross section defined by the axial play 131, the pressure drop mentioned forces hydraulic fluid from the region of the second recess 116, around the drive shaft, and into the region of the first recess 115. In the manner according to the invention, at least one of the axial plays mentioned is selected as greater than that in commercially available Gerotor pumps with the aim of achieving the pressure limiting described above in conjunction with FIG. 1 due to the return flow that is increased in comparison to the commercially available Gerotor pumps, by means of which the boost limiting valve of the prior art is superfluous, which brings the advantage of weight and cost savings.

As mentioned above, for example the increased axial play 131 is associated with only the gear 100. This is achieved by virtue of the fact that a commercially available internal gear ring 101 is used and an associated, commercially available gear 100 is shortened by machining. For this, a sintered gear 100 made of steel, for example, is magnetically fixed and abraded on its end face. Preferably the sintered gear 100 is shortened because machining the smaller diameter of this gear 100 is cheaper than machining the larger diameter of the internal gear ring 101. As a result of this machining, or as a result of the axial play 131 selected according to the invention, the functional advantage is also achieved that when air alone or hydraulic fluid that contains air is aspirated, it finds its way easily enough from the second recess 116 to the first recess 115 in the cross sections determined by the axial play 131. The reason for this is that due to the air or gas bubbles, the fluid disposed in the axial play is less viscous than gas-free hydraulic fluid. Air or gas bubbles or also air alone gives rise to the fact that the pump 71 does not supply pressure of any consequence at the outlet 73. For example, the check valve 61 shown in FIG. 1 can no longer be opened as a result, with the advantage that at least one uninterrupted infeed of air into brake circuit I is prevented.

Other return flow conduits exist because of the disposition of the compensation bore 128 and the connecting bores 126 & 127, because of an inevitable bearing play between the drive shaft 104 and the bearing bore 109, and because of a likewise inevitable bearing play between the drive shaft and the bearing bore 110. These return flow conduits are taken into account in the choice of the axial play 131. Other return flow conduits therefore exist because en route from the region of the first recess 115 to the region of the second recess 116, teeth 129 come out from tooth spacings 131 of the internal gear ring 101. In the spirit of the invention, in the existing return flow conduits, preferably only the axial play 131 is dimensioned as greater than normal in order to achieve pressure limitation.

The concept according to the invention of purposefully producing at least one return flow for limiting the pressure of the low pressure pump can also be transferred to other types of gear pumps which for example have pairs of end gears or other toothed pump elements that engage one another.

Figure 2:
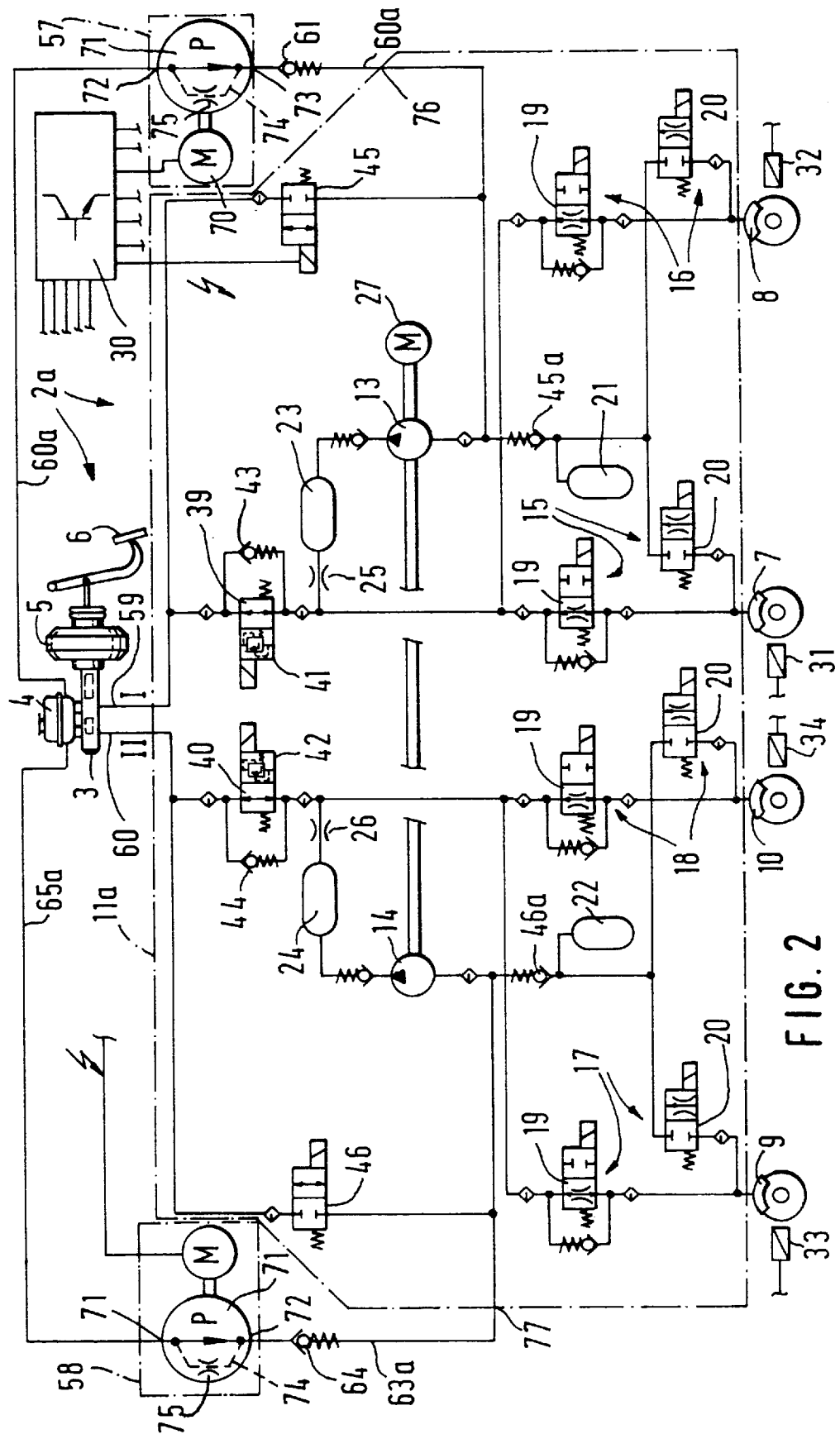
FIG. 2 shows a circuit diagram of a second exemplary embodiment of a hydraulic vehicle brake system with at least one pump unit according to the invention.

The second exemplary embodiment of a hydraulic vehicle brake system 2a according to FIG. 2 differs from the exemplary embodiment of FIG. 1 merely by virtue of the fact that feed lines 60, 63 which lead from the pump units 57, 58 and in which check valves 61, 64 are installed in turn, do not feed into the main brake lines 59, 62, but feed directly into the wheel slip regulator device 11a at connections 76 or 77. These connections 76 and 77 are permanently connected to the respective return feed pump 13 or 14. The 2/2-way valves 45 or 48 are in turn disposed between the main brake lines 59, 60 and the return feed pumps 13, 14. For the purpose of carrying out the above-described automatic braking operation, there is consequently the possibility of switching on the pump units 57, 58 to boost the return feed pumps 13 or 14. When the return feed pumps 13 and 14 are embodied as self-feeding, that is self-aspirating return feed pumps, the 2/2-way valves 45 and 46 can be opened so that for example in the event of failed pump units 57 or 58, the return feed pumps 13 and 14 can supply themselves from the reservoir 4 through the main brake line 59 or 60 and the master cylinder 3. On the other hand, the 2/2-way valves 45 and 46 open up the potential that the pump units 57 and 58 supply hydraulic fluid to the main brake lines 59 and 60 so that as a result of flow resistances in the main brake lines 59 and 60, pressure is produced, which can be used for application of the brake shoes in the wheel brakes 7 to 10.

Which of the two hydraulic vehicle brake systems 2 or 2a is installed in a vehicle can be a function for example of where there is installation space inside the vehicle, on the one hand for accommodating the wheel slip regulator device 11 or 11a and on the other hand for the at least one pump unit 57 or 58. Correspondingly, consideration must be given as to whether the laying of the suction lines 65, 66 or 65a, 66a and the feed lines 60, 63 or 60a, 63a required for the hydraulic vehicle brake system 2 costs less.

Figure 3:
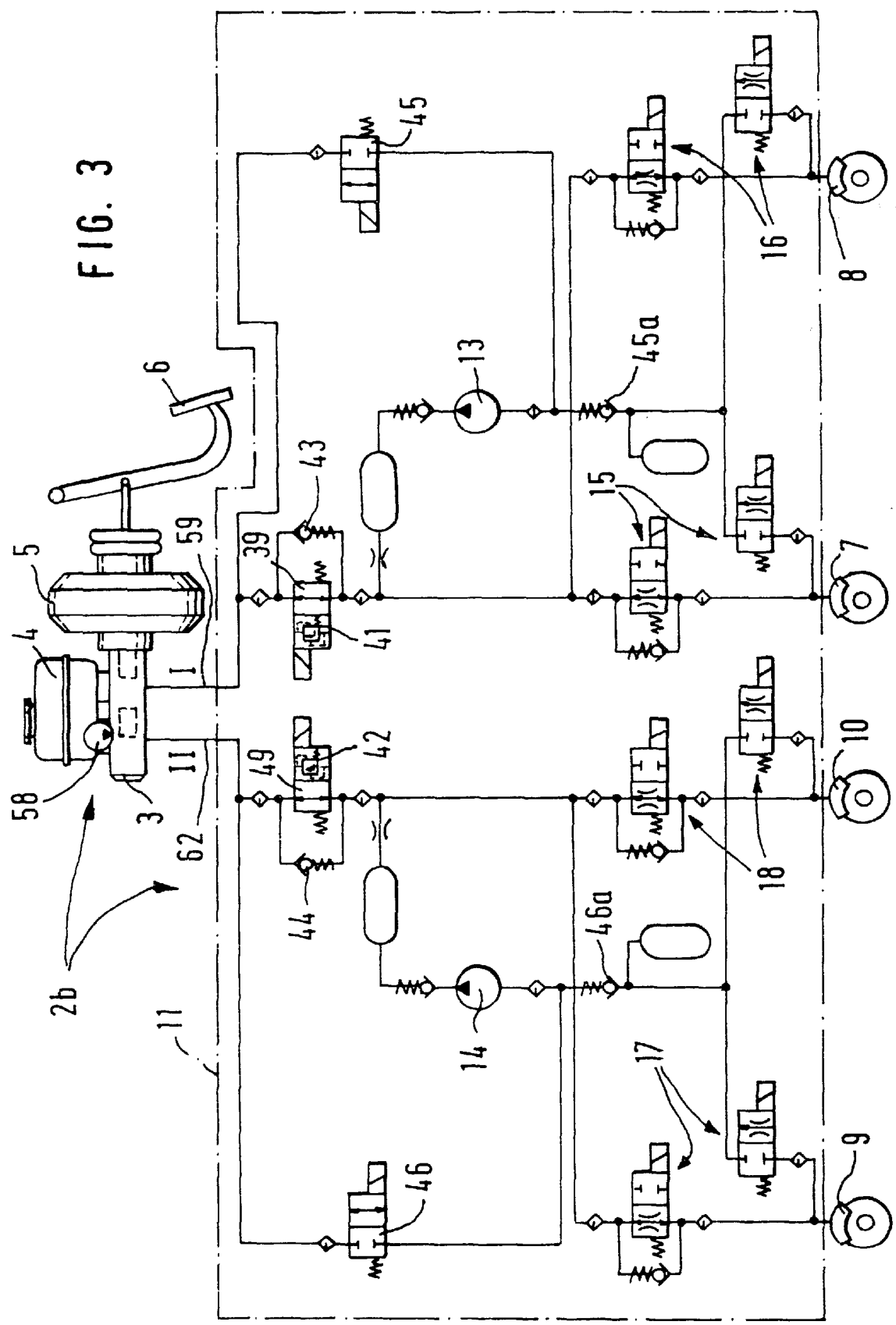
FIG. 3 shows a third exemplary embodiment of a hydraulic vehicle brake system with a pump unit according to the invention.

The third exemplary embodiment of the hydraulic vehicle brake system 26 according to FIG. 3 differs from the exemplary embodiment of the vehicle brake system 2 according to FIG. 1 by virtue of the fact that as indicated, the pump unit 58 is interposed between the reservoir 4 and the master cylinder 3 and is associated with brake circuit II, which has the main brake line 62. For example, for this purpose the pump unit 58 is installed between the reservoir 4 and the master cylinder 3. This disposition of the pump unit 58 between the reservoir 4 and the master cylinder 3 has the advantage that all of the hydraulic fluid that can be fed by the pump element 58 through its outlet finds its way into the main brake line 62 and is therefore available for applying the brake linings of the wheel brakes 9 & 10 and for supplying the return feed pump 14. Accordingly, the delivery capacity of the pump unit 58 can be chosen as smaller than for the hydraulic vehicle brake systems 2 and 2a according to FIGS. 1 and 2.

In the vehicle brake system 2b, the wheel brakes 9 and 10 mentioned are associated for example with drivable front wheels so that the pump unit 58 aids in the rapid elimination of skidding danger in at least one front wheel. Analogous to the one above, the pump unit 58, together with the return feed pump 14, carries out the task of achieving early and rapid brake pressure increases in at least one of the wheel brakes 9 or 10 when a skidding danger has to be counteracted by means of outward drifting rear wheels or when yawing moments have to be produced to facilitate the turning of the vehicle.

Analogous to the two hydraulic brake systems 2 and 2a of FIGS. 1 and 2, the vehicle brake system 2b according to FIG. 3 can have a second pump unit, not shown, whose capacity is available to brake circuit I. As a result, the required braking forces can also be automatically produced by means of the wheel brakes 7 & 8 and can be produced rapidly.

It is clear that the pump unit according to the invention, which does not require an expensive pressure limiting valve according to the prior art, can be combined with wheel slip regulator devices that are embodied in a way that is different from automatic brakes.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A hydraulic vehicle brake system with a wheel slip regulator device that counters a danger of wheel locking when braking and is for automatic braking, wherein the wheel slip regulator device is disposed between a master cylinder and at least one wheel brake, and comprises at least one high pressure pump, at least one brake pressure modulation valve device, and for the purpose of supplying the at least one high pressure pump with hydraulic fluid during automatic braking operation, has a reservoir connected to a pump unit with a low pressure pump that has a toothed element, and a motor that drives the low pressure pump, the low pressure pump (71) has a housing (102), an inlet (72), and an outlet (73) and that inside the housing (102, 103), there is at least one return flow conduit (74) that connects the outlet (73) to inlet (72) and a cross section of the return flow conduit is dimensioned to function as at least one throttle (75), that when the outflow of hydraulic fluid from the outlet (73) of the low pressure pump (71) is prevented and when there is a predetermined viscosity of the hydraulic fluid as well as a predetermined drive speed of the low pressure pump (71) by means of hydraulic fluid flow determined by the at least one throttle (75), a pressure limitation to a desired value takes place, and the housing (102) is associated with a housing cover (103) which has a projection (119) oriented toward the motor (70).

2. A hydraulic vehicle brake system with a wheel slip regulator device that counters a danger of wheel locking when braking and is for automatic braking, the wheel slip regulator device is disposed between a master cylinder and at least one wheel brake, said wheel slip regulator device comprises at least one high pressure pump, at least one brake pressure modulation valve device, and for the purpose of supplying the at least one high pressure pump with hydraulic fluid during automatic braking operation, said wheel slip regulator device has a reservoir connected to a pump unit with a low pressure pump that has a toothed element, and motor that dries the low pressure pump, the low pressure pump (71) has a housing (102), an inlet (72), and an outlet (73) and that inside the housing (102, 103), there is at least one return flow conduit (74) that connects the outlet (73) to inlet (72), and a cross section of the return flow conduit is dimensioned to function as at least one throttle (75), that when the outflow of hydraulic fluid from the outlet (73) of the low pressure pump (71) is prevented and when there is a predetermined viscosity of the hydraulic fluid as well as a predetermined drive speed of the low pressure pump (71) by means of hydraulic fluid flow determined by the at least one throttle (75), a pressure limitation to a desired value takes place, the low pressure pump (71) has rotatable pump elements (100, 101) with teeth (129) and tooth spaces (130), that a face (112) disposed in the housing (102) is oriented with its end face toward the pump elements (100, 101) and has a first recess (115) connected to the inlet (72) which forms a suction side and has a second recess (116) connected to the outlet (73) which forms a pressure side, and that the at least one return flow conduit (74) leads from the pressure side recess (116) to the suction side recess (115), wherein the at least one return flow conduit (74) constitutes a throttle (75) by means of the selection of the size of an axial play (131) between the face (112) and at least one of the drivable pump elements (100, 101).

3. The hydraulic vehicle brake system according to claim 2, in which a first pump element is embodied as a gear (100) and that a second pump element is embodied as an internal gear ring (101) with a number of tooth spaces (130), which is one tooth space greater than the number of teeth (129) of the gear (100), wherein the at least one return flow conduit (74) runs along at least one of the two pump elements (100, 101).

4. The hydraulic vehicle brake system according to claim 2, in which the housing (102) is associated with a housing cover (103) which has a projection (119) oriented toward the motor (70).

5. The hydraulic vehicle brake system according to claim 3, in which the housing (102) is associated with a housing cover (103) which has a projection (119) oriented toward the motor (70).

6. The hydraulic vehicle brake system according to claim 2, in which the master cylinder (3) is embodied as having two circuits for the two brake circuits (I, II) and has a reservoir (4), that the wheel slip regulator device (11, 11a) is embodied as having two circuits and each brake circuit (I, II) has a high pressure pump which, in antilock operation when braking, is switched on as a return feed pump (13, 14) that supplies the master cylinder and is connected to at least one brake pressure modulation valve device, that for automatic braking operation using at least one of the brake pressure modulation devices (15, 16, 17, 18) at least for one brake circuit (I or II), a pump unit (57, 58) is provided with the low pressure pump (71), whose inlet (72) is connected to the reservoir (4) by means of a suction line (65, 66, 65a, 66a) and whose outlet (73), in automatic braking operation, supplies the high pressure pump (13, 14) by means of a feed line (60, 63, 60a, 63a) and a check valve (61, 64) built into it.

7. The hydraulic vehicle brake system according to claim 3, in which the master cylinder (3) is embodied as having two circuits for the two brake circuits (I, II) and has a reservoir (4), that the wheel slip regulator device (11, 11a) is embodied as having two circuits and each brake circuit (I, II) has a high pressure pump which, in antilock operation when braking, is switched on as a return feed pump (13, 14) that supplies the master cylinder and is connected to at least one brake pressure modulation valve device, that for automatic braking operation using at least one of the brake pressure modulation devices (15, 16, 17, 18) at least for one brake circuit (I or II), a pump unit (57, 58) is provided with the low pressure pump (71), whose inlet (72) is connected to the reservoir (4) by means of a suction line (65, 66, 65a, 66a) and whose outlet (73), in automatic braking operation, supplies the high pressure pump (13, 14) by means of a feed line (60, 63, 60a, 63a) and a check valve (61, 64) built into it.

8. The hydraulic vehicle brake system according to claim 1, in which the master cylinder (3) is embodied as having two circuits for the two brake circuits (I, II) and has a reservoir (4), that the wheel slip regulator device (11, 11a) is embodied as having two circuits and each brake circuit (I, II) has a high pressure pump which, in antilock operation when braking, is switched on as a return feed pump (13, 14) that supplies the master cylinder and is connected to at least one brake pressure modulation valve device, that for automatic braking operation using at least one of the brake pressure modulation devices (15, 16, 17, 18) at least for one brake circuit (I or II), a pump unit (57, 58) is provided with the low pressure pump (71), whose inlet (72) is connected to the reservoir (4) by means of a suction line (65, 66, 65a, 66a) and whose outlet (73), in automatic braking operation, supplies the high pressure pump (13, 14) by means of a feed line (60, 63, 60a, 63a) and a check valve (61, 64) built into it.

9. The hydraulic vehicle brake system according to claim 6, in which the feed line (60, 63) is connected to a main brake line (59, 62) that runs between the master cylinder (3) and the wheel slip regulator device (11), that a 2/2-way valve (45, 46) is disposed inside the wheel slip regulator device (11a), between this main brake line (59, 62) and the high pressure pump (13, 14), which valve is normally closed and can be opened for automatic braking operation.

10. The hydraulic vehicle brake system according to claim 7, in which the feed line (60, 63) is connected to a main brake line (59, 62) that runs between the master cylinder (3) and the wheel slip regulator device (11), that a 2/2-way valve (45, 46) is disposed inside the wheel slip regulator device (11a), between this main brake line (59, 62) and the high pressure pump (13, 14), which valve is normally closed and can be opened for automatic braking operation.

11. The hydraulic vehicle brake system according to claim 8, in which the feed line (60, 63) is connected to a main brake line (59, 62) that runs between the master cylinder (3) and the wheel slip regulator device (11), that a 2/2-way valve (45, 46) is disposed inside the wheel slip regulator device (11a), between this main brake line (59, 62) and the high pressure pump (13, 14), which valve is normally closed and can be opened for automatic braking operation.

* * * * *